US012607181B2

(12) United States Patent
Maruyama et al.

(10) Patent No.: US 12,607,181 B2
(45) Date of Patent: Apr. 21, 2026

(54) PRESSURE ACTUATED DIAPHRAGM PUMP

(71) Applicant: MARUYAMA MFG. CO., INC., Tokyo (JP)

(72) Inventors: Yushi Maruyama, Tokyo (JP); Toshimitsu Kuzuoka, Tokyo (JP); Toshihisa Nemoto, Tokyo (JP)

( * ) Notice: Subject to any disclaimer, the term of this patent is extended or adjusted under 35 U.S.C. 154(b) by 0 days.

(21) Appl. No.: 18/741,815

(22) Filed: Jun. 13, 2024

(65) Prior Publication Data

US 2025/0059966 A1 Feb. 20, 2025

(30) Foreign Application Priority Data

Aug. 18, 2023 (JP) ................................ 2023-133274

(51) Int. Cl.

*F04B 43/06* (2006.01)
*F02M 59/14* (2006.01)
*F04B 27/18* (2006.01)
*F04B 43/02* (2006.01)
*F04B 45/04* (2006.01)
*F04B 53/10* (2006.01)

(52) U.S. Cl.

CPC ............. *F04B 43/06* (2013.01); *F02M 59/14* (2013.01); *F04B 53/1032* (2013.01); *F04B 27/1804* (2013.01); *F04B 43/028* (2013.01); *F04B 45/04* (2013.01); *F04B 45/045* (2013.01); *F04B 53/1047* (2013.01)

(58) Field of Classification Search

CPC combination set(s) only.
See application file for complete search history.

(56) References Cited

U.S. PATENT DOCUMENTS 4,124,008 A * 11/1978 Fujikawa ............. F04B 49/225 123/495
5,259,352 A 11/1993 Gerhardy et al.
5,279,504 A 1/1994 Williams
5,341,776 A 8/1994 Phelps
5,419,686 A 5/1995 Wissmann et al.
(Continued)

FOREIGN PATENT DOCUMENTS

CN 204200433 3/2015
EP 1505291 2/2005
(Continued)

OTHER PUBLICATIONS

Extended Search Report in corresponding European Application No. 24184607.0, dated Dec. 12, 2024.
Extended Search Report in corresponding European Application No. 23175261.9 dated Oct. 25, 2023.
Soei Patent and Law Firm, Statement of Related Matters, dated Oct. 2, 2025.

*Primary Examiner* — Binh Q Tran
(74) *Attorney, Agent, or Firm* — SHIPWAY IP

(57) ABSTRACT

A diaphragm pump includes a discharge chamber, a diaphragm configured to be actuated by a pulsation pressure, a fuel flow path fluidly coupled with the discharge chamber, and a fuel chamber located on the fuel flow path. The diaphragm includes a diaphragm actuating portion forming a part of the discharge chamber, and configured to suction fuel into the discharge chamber and to discharge the fuel from the discharge chamber in response to being actuated by the pulsation pressure, and a valve actuating portion located in the fuel chamber and configured to selectively open and close the fuel flow path.

20 Claims, 6 Drawing Sheets

(56) References Cited

U.S. PATENT DOCUMENTS

| | | | | |
|---|---|---|---|---|
| 2001/0018909 | A1 * | 9/2001 | Ishikawa | F04B 43/06 417/246 |
| 2002/0085928 | A1 * | 7/2002 | Chiba | F04B 43/06 417/440 |
| 2007/0013085 | A1 * | 1/2007 | Araki | F02M 17/04 261/DIG. 80 |
| 2008/0211116 | A1 * | 9/2008 | Zbytowski | F02M 7/08 261/119.2 |
| 2013/0145825 | A1 * | 6/2013 | Kinnen | G01M 3/025 73/40.5 R |
| 2014/0026857 | A1 | 1/2014 | Tsutsui et al. | |
| 2014/0026863 | A1 * | 1/2014 | Sumi | F02M 17/04 123/495 |
| 2023/0392590 | A1 * | 12/2023 | Maruyama | F04B 43/06 |

FOREIGN PATENT DOCUMENTS

| | | |
|---|---|---|
| EP | 1914416 | 4/2008 |
| JP | S49-019118 | 2/1974 |
| JP | H6-093975 | 4/1994 |
| JP | H9-119356 | 5/1997 |
| JP | 2010-090846 | 4/2010 |
| JP | 2011-522161 | 7/2011 |
| JP | 2014-025460 | 2/2014 |
| WO | 2009/155074 | 12/2009 |

* cited by examiner

PRESSURE ACTUATED DIAPHRAGM PUMP

CROSS-REFERENCE TO RELATED APPLICATIONS

This application is based upon and claims the benefit of priority from Japanese Patent Application No. 2023-133274, filed on Aug. 18, 2023, the entire contents of which are incorporated herein by reference.

BACKGROUND

Field

The present disclosure relates to a diaphragm pump.

Description of the Related Art

Japanese Unexamined Patent Application Publication No. 2010-90846 discloses a diaphragm pump which is actuated by receiving pulsation pressure in a crank chamber of an engine. In the diaphragm pump, a diaphragm that is actuated by receiving a pulsation pressure and components such as a plurality of valves are used.

SUMMARY

Disclosed herein is an example diaphragm pump that is actuated by receiving pulsation pressure in a crank chamber of an engine. The diaphragm pump includes a discharge chamber, a diaphragm having a diaphragm actuating portion that is actuated by the pulsation pressure and suctions fuel into the discharge chamber and discharges the fuel in the discharge chamber, a supply path that supplies the fuel to the discharge chamber, a supply valve that is provided in the supply path and allows only the flow of the fuel in a direction toward the discharge chamber, and a supply-side fuel chamber that is provided in a middle portion of the supply path. The supply path includes an upstream-side supply path arranged upstream of the supply-side fuel chamber, and a downstream-side supply path arranged downstream of the fuel chamber. A supply inlet through which the fuel flows into the fuel chamber from the upstream-side supply path, and a supply outlet through which the fuel flows out from the supply-side fuel chamber to the downstream-side supply path face the supply-side fuel chamber. The supply valve includes a supply-side valve body that is located in the supply-side fuel chamber and openably covers the supply inlet, and a supply-side biasing member that biases the supply-side valve body to close the supply inlet. The supply-side valve body is configured of a portion of the diaphragm other than the diaphragm actuating portion. In some examples, the diaphragm may include a supply-side valve actuating portion located in the supply-side fuel chamber, and the supply-side valve body may be provided in the supply-side valve actuating portion.

In the diaphragm pump, the supply-side valve body of the supply valve may be configured by a part of the diaphragm. The diaphragm may include the diaphragm actuating portion and the supply-side valve body. Therefore, the diaphragm pump may not require a separate valve body component, allowing for a reduction in the number of parts.

The supply-side valve actuating portion may be located between the supply inlet and the supply-side biasing member so as to partition a supply first region in which the supply inlet is located and a supply second region in which the supply-side biasing member is located. The supply-side valve actuating portion includes the supply-side valve body. The supply-side valve actuating portion may include: a supply first passage port that fluidly couples the supply first region and the supply second region while avoiding the supply-side valve body; and a supply second passage port that faces the supply outlet and fluidly couples the supply outlet and the supply second region.

When the diaphragm actuating portion is actuated in the discharge chamber to suction the fuel, a negative pressure is generated in the supply second region, and a force against the supply-side biasing member acts on the supply-side valve body. As a result, the supply-side valve body that has closed the supply inlet is separated from the supply inlet and the supply inlet opens, and the fuel flows into the supply first region from the supply inlet. The fuel that has flowed into the supply first region passes through the supply first passage port, flows into the supply second region, and further passes through the supply second passage port to reach the supply outlet.

The supply first passage port may include a first suction-side slit and a second suction-side slit provided so as to sandwich the supply inlet. The supply-side valve body may be located between the first suction-side slit and the second suction-side slit. In this case, the supply-side valve body is in a state where both end portions in the extending direction of the first suction-side slit and the second suction-side slit are coupled with the other portion of the supply-side valve actuating portion. Therefore, in the supply-side valve body, since the opening and closing operation of the supply inlet is performed in a state where both end portions are supported, the occurrence of turn-up in the movement is suppressed. As a result, the supply-side valve body may perform the opening and closing operation of the supply inlet.

The extending direction of the first suction-side slit and the second suction-side slit may be along a flow direction of the fuel from the supply inlet toward the supply outlet in the supply-side fuel chamber. In this case, it is difficult to disturb the flow of the fuel, and the occurrence of turn-up and the like of the supply-side valve body due to the flow of the fuel is prevented in the supply-side fuel chamber.

The supply-side fuel chamber may be narrow in width towards the supply outlet as it gets farther from the supply inlet around the supply outlet. In this case, the diaphragm pump may guide the fuel flowing from the supply inlet toward the supply outlet toward the supply outlet in the supply-side fuel chamber. As described above, the diaphragm pump may suppress stagnation of the fuel in the supply-side fuel chamber.

The outer diameter of the supply-side biasing member may be larger than the diameter of the supply inlet. In this case, the supply-side biasing member may bias the supply-side valve body to cover the supply inlet without the supply-side valve body entering the supply inlet.

The diaphragm may include a discharge path that discharges the fuel from the discharge chamber, a discharge valve that is provided in the discharge path and allows only the flow of the fuel in a direction in which the fuel is discharged from the discharge chamber, and a discharge-side fuel chamber that is provided in a middle portion of the discharge path. The discharge path may include an upstream-side discharge path arranged upstream of the discharge-side fuel chamber, and a downstream-side discharge path arranged downstream of the discharge-side fuel chamber. A discharge inlet through which the fuel flows into the discharge-side fuel chamber from the upstream-side discharge path and a discharge outlet through which the fuel flows out of the discharge-side fuel chamber to the downstream-side discharge path face the discharge-side fuel chamber. The discharge valve may include a discharge-side valve body that is located in the discharge-side fuel chamber and openably covers the discharge inlet, and a discharge-side biasing member configured to bias the discharge-side valve body to close the discharge inlet. The discharge-side valve body may be configured of a portion of the diaphragm other than the diaphragm actuating portion. In some examples, the diaphragm may include a discharge-side valve actuating portion located in the discharge-side fuel chamber, and the discharge-side valve body may be provided in the discharge-side valve actuating portion.

In the diaphragm pump, the discharge-side valve body of the discharge valve may be configured by a part of the diaphragm. The diaphragm may include the diaphragm actuating portion and the discharge-side valve body. Therefore, the diaphragm pump may not require a separate valve body component, allowing for a reduction in the number of parts.

The discharge-side valve actuating portion may be located between the discharge inlet and the discharge-side biasing member so as to partition a discharge first region in which the discharge inlet is located and a discharge second region in which the discharge-side biasing member is located. The discharge-side valve actuating portion includes the discharge-side valve body. The discharge-side valve actuating portion may include: a discharge first passage port that fluidly couples the discharge first region and the discharge second region while avoiding the discharge-side valve body; and a discharge second passage port that faces the discharge outlet and fluidly couples the discharge outlet and the discharge second region.

When the diaphragm actuating portion is actuated in the discharge chamber to discharge the fuel, a force against the discharge-side biasing member acts on the discharge-side valve body. As a result, the discharge-side valve body that has closed the discharge inlet is separated from the discharge inlet and the discharge inlet opens, and the fuel flows into the discharge first region from the discharge inlet. The fuel that has flowed into the discharge first region passes through the discharge first passage port, flows into the discharge second region, and further passes through the discharge second passage port to reach the discharge outlet.

The discharge first passage port may include a first discharge-side slit and a second discharge-side slit provided so as to sandwich the discharge inlet. The discharge-side valve body may be located between the first discharge-side slit and the second discharge-side slit. In this case, the discharge-side valve body is in a state where both end portions in the extending direction of the first discharge-side slit and the second discharge-side slit are connected to the other portion of the discharge-side valve actuating portion. Therefore, in the discharge-side valve body, since the opening and closing operation of the discharge inlet is performed in a state where both end portions are supported, the occurrence of turn-up in the movement is suppressed. As a result, the discharge-side valve body may perform the opening and closing operation of the discharge inlet.

The extending direction of the first discharge-side slit and the second discharge-side slit may be along a flow direction of the fuel from the discharge inlet toward the discharge outlet in the discharge-side fuel chamber. In this case, it is difficult to disturb the flow of the fuel, and the occurrence of turn-up and the like of the discharge-side valve body due to the flow of the fuel is prevented in the discharge-side fuel chamber.

The discharge-side fuel chamber may be narrow in width towards the discharge outlet as it gets farther from the discharge inlet around the discharge outlet. In this case, the diaphragm pump may guide the fuel flowing from the discharge inlet toward the discharge outlet toward the discharge outlet in the discharge-side fuel chamber. As described above, the diaphragm pump may suppress stagnation of the fuel in the discharge-side fuel chamber.

The outer diameter of the discharge-side biasing member may be larger than the diameter of the discharge inlet. In this case, the discharge-side biasing member may bias the discharge-side valve body to cover the discharge inlet without the discharge-side valve body entering the discharge inlet.

Additionally, an example diaphragm pump is disclosed herein. The diaphragm pump is actuated by receiving pulsation pressure in a crank chamber of an engine. The diaphragm pump includes a discharge chamber, a diaphragm having a diaphragm actuating portion that is actuated by the pulsation pressure and suctions fuel into the discharge chamber and discharges the fuel in the discharge chamber, a discharge path that supplies the fuel to the discharge chamber, a discharge valve that is provided in the discharge path and allows only the flow of the fuel in a direction in which the fuel is discharged from the discharge chamber, and a discharge-side fuel chamber that is provided in a middle portion of the discharge path. The discharge path includes the upstream-side discharge path arranged upstream of the discharge-side fuel chamber, and a downstream-side discharge path arranged downstream of the discharge-side fuel chamber. The discharge inlet through which the fuel flows into the discharge-side fuel chamber from the upstream-side discharge path and the discharge outlet through which the fuel flows out of the discharge-side fuel chamber to the downstream-side discharge path face the discharge-side fuel chamber. The discharge valve includes the discharge-side valve body that is located in the discharge-side fuel chamber and openably covers the discharge inlet, and the discharge-side biasing member configured to bias the discharge-side valve body to close the discharge inlet. The discharge-side valve body is configured of a portion of the diaphragm other than the diaphragm actuating portion. In some examples, the diaphragm may include the discharge-side valve actuating portion located in the discharge-side fuel chamber, and the discharge-side valve body may be provided in the discharge-side valve actuating portion.

In the diaphragm pump, the discharge-side valve body of the discharge valve may be configured by a part of the diaphragm. The diaphragm may include the diaphragm actuating portion and the discharge-side valve body. Therefore, the diaphragm pump may not require a separate valve body component, allowing for a reduction in the number of parts.

DETAILED DESCRIPTION

In the following description, with reference to the drawings, the same reference numbers are assigned to the same components or to similar components having the same function, and overlapping description is omitted.

Figure 1:
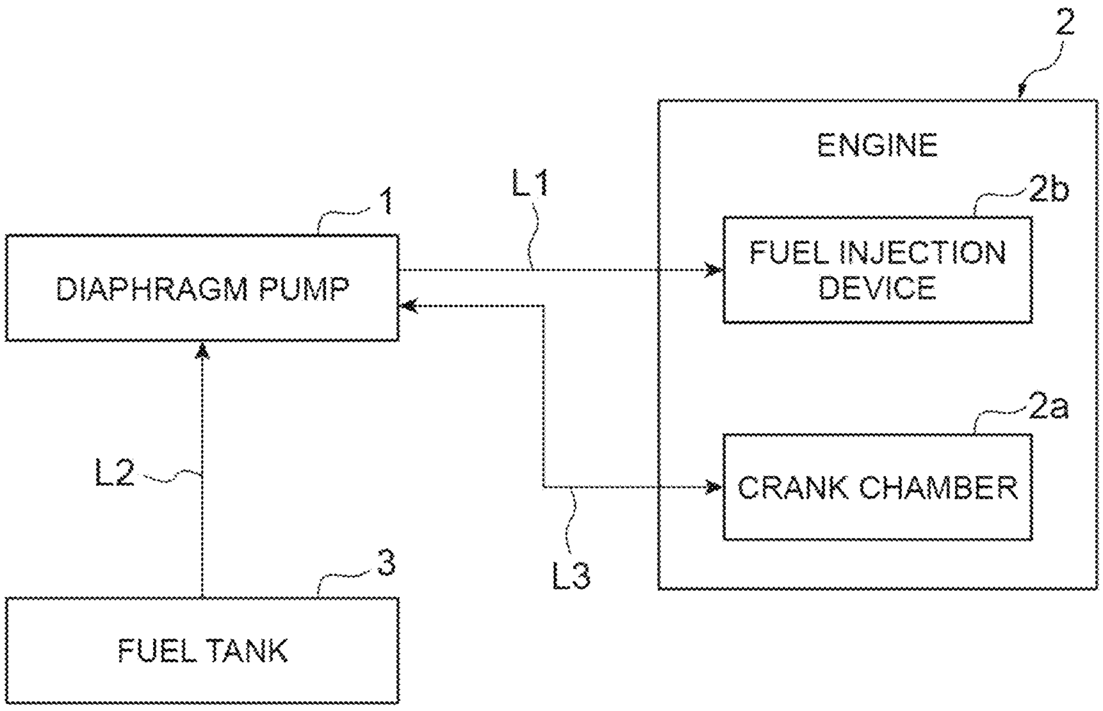
FIG. 1 is a block diagram illustrating an engine unit provided with an example diaphragm pump.

As illustrated in FIG. 1, an example diaphragm pump 1 functions as a fuel pump that supplies fuel to an engine 2. The diaphragm pump 1 is actuated by receiving pulsation pressure in a crank chamber 2*a* of the engine 2 (pressure fluctuation of gas in the crank chamber 2*a*). Here, the diaphragm pump 1 is connected to the crank chamber 2*a* of the engine 2 by a pipe L3. As a result, the diaphragm pump 1 can receive the pulsation pressure of the crank chamber 2*a* via the pipe L3.

The diaphragm pump 1 suctions fuel from the fuel tank 3 via a pipe L2, and supplies the fuel with increased pressure to a fuel injection device 2*b* provided in the engine 2 via a pipe L1. Further, the diaphragm pump 1 may have a mechanism for returning surplus fuel, which is not supplied to the engine 2, of the fuel suctioned from the fuel tank 3 to the tank.

Figure 2:
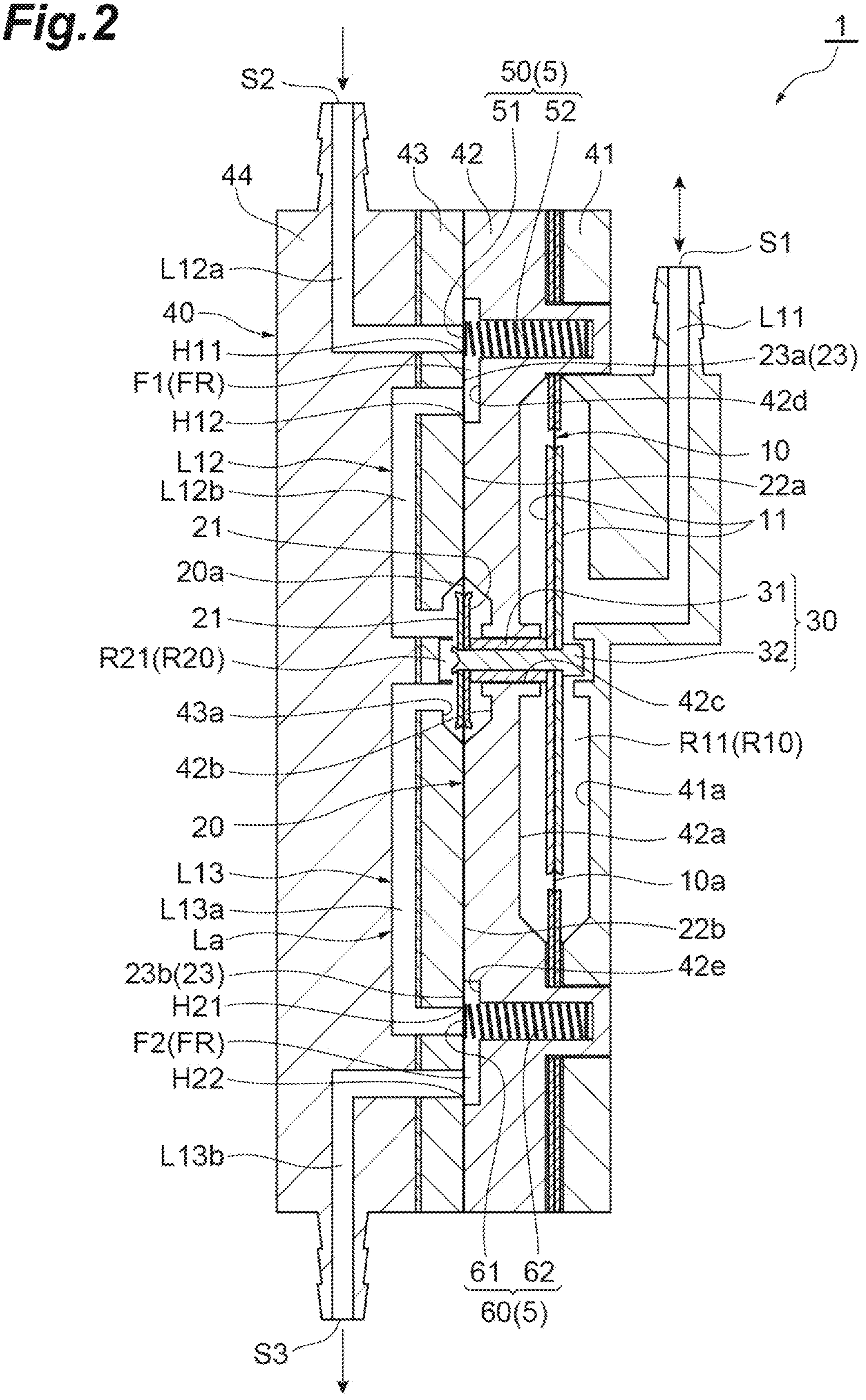
FIG. 2 is a cross-sectional view of the diaphragm pump.

As illustrated in FIG. 2, the diaphragm pump 1 includes a diaphragm (e.g., high-pressure-side diaphragm 20), a coupling unit 30, a main body 40, a supply valve 50, and a discharge valve 60. Further, the diaphragm pump 1 includes, for example, a low-pressure-side diaphragm 10.

The main body 40 includes a first actuation region R10, a second actuation region R20, and the like, which will be described later. The main body 40 is configured by stacking a first main body unit 41, a second main body unit 42, a third main body unit 43, and a fourth main body unit 44 in this arrangement order. Gaskets are located between the stacked members such as the first main body unit 41 to the fourth main body unit 44. The first main body unit 41 to the fourth main body unit 44 are fixed to each other by screws or the like.

The first actuation region R10 is formed between the first main body unit 41 and the second main body unit 42. The first actuation region R10 is a region where a low-pressure-side actuating portion 10*a* of the low-pressure-side diaphragm 10 is operated. The schematic shape of the first actuation region R10 is a thin columnar shape with the stacking direction of the first main body unit 41 and the second main body unit 42 as an axis.

A surface of the first main body unit 41 on the second main body unit 42 side is provided with a recess 41*a*. Further, a surface of the second main body unit 42 on the first main body unit 41 side is provided with a recess 42*a*. The recess 41*a* and the recess 42*a* face each other. The first actuation region R10 is formed by the recess 41*a* of the first main body unit 41 and the recess 42*a* of the second main body unit 42.

A pulsation transmission port S1 is formed in the first main body unit 41. The pipe L3 (see FIG. 1) connected to the crank chamber 2*a* of the engine 2 is connected to the pulsation transmission port S1. A pulsation transmission path L11 connecting the pulsation transmission port S1 and the first actuation region R10 is formed in the first main body unit 41.

A diaphragm actuation region (e.g., second actuation region R20) is formed between the second main body unit 42 and the third main body unit 43. The second actuation region R20 is a region where the high-pressure-side actuating portion 20*a* of the high-pressure-side diaphragm 20 is actuated. The schematic shape of the second actuation region R20 is a thin columnar shape with the stacking direction of the second main body unit 42 and the third main body unit 43 as an axis.

A surface of the second main body unit 42 on the third main body unit 43 side (a side surface facing the third main body unit 43) is provided with a recess 42*b*. A surface of the third main body unit 43 on the second main body unit 42 side (a side surface facing the second main body unit 42) is provided with a recess 43*a*. The recess 42*b* and the recess 43*a* face each other. The second actuation region R20 is formed by the recess 42*b* of the second main body unit 42 and the recess 43*a* of the third main body unit 43.

A suction port S2 and a discharge port S3 are formed in the fourth main body unit 44. The pipe L2 (see FIG. 1) connected to the fuel tank 3 is connected to the suction port S2. The pipe L1 connected to the fuel injection device 2*b* of the engine 2 is connected to the discharge port S3.

An elastically deformable low-pressure-side diaphragm 10 is located between the first main body unit 41 and the second main body unit 42. The low-pressure-side diaphragm 10 divides the first actuation region R10 into two. The low-pressure-side diaphragm 10 is held by the first main body unit 41 and the second main body unit 42 by being sandwiched between the first main body unit 41 and the second main body unit 42. In the first actuation region R10, a space between the low-pressure-side diaphragm 10 and the recess 41*a* of the first main body unit 41 communicates with the crank chamber 2*a* via the pulsation transmission path L11 and the pipe L3. Hereinafter, in the first actuation region R10, the space between the low-pressure-side diaphragm 10 and the recess 41*a* of the first main body unit 41 is referred to as a pulsation operation chamber R11. The pulsation pressure of the crank chamber 2*a* is transmitted to the pulsation operation chamber R11 via the pulsation transmission path L11 and the pipe L3.

A portion of the low-pressure-side diaphragm 10 in the first actuation region R10 becomes an operation range in which the operation is performed by receiving the pulsation pressure in the crank chamber 2*a*. Hereinafter, the portion of the low-pressure-side diaphragm 10 in the first actuation region R10 is referred to as the low-pressure-side actuating portion 10*a*.

A low-pressure-side backup 11 is attached to the low-pressure-side actuating portion 10*a*. As illustrated in FIG. 1, two low-pressure-side backups 11 are provided. The two low-pressure-side backups 11 sandwich the low-pressure-side actuating portion 10*a* to assist the low-pressure-side actuating portion 10*a* in terms of strength, and support the low-pressure-side actuating portion 10*a*.

The low-pressure-side diaphragm 10 faces the pulsation operation chamber R11. The low-pressure-side diaphragm 10 forms a part of the pulsation operation chamber R11 to which the pulsation pressure of the crank chamber 2*a* of the engine 2 is transmitted. Therefore, the low-pressure-side actuating portion 10*a* of the low-pressure-side diaphragm 10 is actuated by receiving the pulsation pressure of the crank chamber 2*a*.

An elastically deformable high-pressure-side diaphragm 20 is located between the second main body unit 42 and the third main body unit 43. The high-pressure-side diaphragm 20 is held by the second main body unit 42 and the third main body unit 43 by being sandwiched between the second main body unit 42 and the third main body unit 43.

The high-pressure-side diaphragm 20 extends to a portion other than the second actuation region R20 between the second main body unit 42 and the third main body unit 43. In some examples, the main body 40 includes a fuel chamber FR having a supply-side fuel chamber F1 and a discharge-side fuel chamber F2. The high-pressure-side diaphragm 20 also extends to a portion of the supply-side fuel chamber F1 and the discharge-side fuel chamber F2. As illustrated in FIG. 1, the high-pressure-side diaphragm 20 has a shape expanding over the entire contact surface between the second main body unit 42 and the third main body unit 43.

The high-pressure-side diaphragm 20 divides the second actuation region R20 into two. In a space divided into two, a space between the high-pressure-side diaphragm 20 and the recess 43*a* of the third main body unit 43 is a discharge chamber (e.g., pump chamber R21). A portion of the high-pressure-side diaphragm 20 in the second actuation region R20 becomes an operation range in which the operation is performed by receiving the pulsation pressure in the crank chamber 2*a*. The portion of the high-pressure-side diaphragm 20 in the second actuation region R20 is a diaphragm actuating portion (e.g., high-pressure-side actuating portion 20*a*).

A high-pressure-side backup 21 is attached to the high-pressure-side actuating portion 20*a*. As illustrated in FIG. 1 two high-pressure-side backups 21 are illustrated. The two high-pressure-side backups 21 sandwich the high-pressure-side actuating portion 20*a* to assist and support the high-pressure-side backup 21 in terms of strength.

The high-pressure-side actuating portion 20*a* faces the pump chamber R21. The pump chamber R21 generates, for example, pressurized fuel to be supplied to the fuel injection device 2*b* of the engine 2. The high-pressure-side actuating portion 20*a* forms a part of the pump chamber R21 that supplies fuel to the fuel injection device 2*b* of the engine 2. The high-pressure-side actuating portion 20*a* is actuated in conjunction with the low-pressure-side diaphragm 10. As a result, the high-pressure-side actuating portion 20*a* suctions the fuel from the fuel tank 3 into the pump chamber R21 and supplies (discharges) the fuel in the pump chamber R21 toward the fuel injection device 2*b*.

The coupling unit 30 passes through a guide hole 42*c* provided in the second main body unit 42, and couples the low-pressure-side diaphragm 10 and the high-pressure-side diaphragm 20. The coupling unit 30 includes, for example, a sleeve 31 and a rivet 32. The sleeve 31 is located between the low-pressure-side diaphragm 10 and the high-pressure-side diaphragm 20. The rivet 32 fixes the low-pressure-side diaphragm 10 and the high-pressure-side diaphragm 20 to the sleeve 31 in a state where the sleeve 31 is sandwiched between the low-pressure-side diaphragm 10 and the high-pressure-side diaphragm 20. As a result, the high-pressure-side actuating portion 20*a* is actuated in conjunction with the low-pressure-side actuating portion 10*a*. The high-pressure-side actuating portion 20*a* is coupled by the coupling portion 30, and thus is actuated in conjunction with the low-pressure-side actuating portion 10*a* that is actuated by the pulsation pressure of the crank chamber 2*a* of the engine 2.

The diaphragm pump 1 includes a fuel flow path La through which fuel flows. The fuel flow path La is fluidly coupled to the pump chamber R21. The diaphragm pump 1 includes a fuel chamber FR located in the fuel flow path La and through which fuel flows. The fuel flow path La includes a supply path L12 coupling the suction port S2 and the pump chamber R21, and a discharge path L13 coupling the pump chamber R21 and the discharge port S3. The fuel chamber FR includes a supply-side valve chamber (e.g., supply-side fuel chamber F1) and a discharge-side valve chamber (e.g., discharge-side fuel chamber F2). The diaphragm pump 1 includes a valve assembly 5 configured to allow only the flow of the fuel flowing through the fuel flow path La in one direction and block the flow in the reverse direction. The valve assembly 5 includes a supply valve 50 located in the supply-side fuel chamber F1 and a discharge valve 60 located in the discharge-side fuel chamber F2.

The supply path L12 supplies the fuel guided from the fuel tank 3 to the suction port S2 via the pipe L2 to the pump chamber R21. As illustrated in FIG. 1, the supply path L12 is formed by grooves and holes provided in the second main body unit 42, the third main body unit 43, and the fourth main body unit 44.

The supply-side fuel chamber F1 is provided in a middle portion of the supply path L12. In the example illustrated in FIG. 1, the supply-side fuel chamber F1 is formed by a recess 42*d* provided on a side surface of the second main body unit 42 facing the third main body unit 43, and the third main body unit 43. A fuel inlet (e.g., supply inlet H11) and a fuel outlet (e.g., supply outlet H12) face the supply-side fuel chamber F1 (see FIG. 3B).

The supply path L12 includes a portion upstream of the supply-side fuel chamber F1 (e.g., upstream-side supply path L12*a*) and a portion downstream of the supply-side fuel chamber F1 (e.g., downstream-side supply path L12*b*). The upstream-side supply path L12*a* includes a supply inlet H11, and the supply inlet H11 fluidly couples the upstream-side supply path L12*a* and the supply-side fuel chamber F1. The supply outlet H12 fluidly couples the supply-side fuel chamber F1 and the downstream-side supply path L12*b*. The supply inlet H11 serves as an inlet through which fuel flows from the upstream-side supply path L12*a* into the supply-side fuel chamber F1. The supply outlet H12 serves as an outlet through which fuel flows out from the supply-side fuel chamber F1 to the downstream-side supply path L12*b*.

The discharge path L13 guides the fuel pressurized in the pump chamber R21 to the discharge port S3. In the example illustrated in FIG. 1, the discharge path L13 is formed by grooves and holes provided in the second main body unit 42, the third main body unit 43, and the fourth main body unit 44.

The discharge-side fuel chamber F2 is provided in a middle portion of the discharge path L13. The discharge-side fuel chamber F2 is formed by a recess 42*e* provided on a side surface of the second main body unit 42 facing the third main body unit 43, and the third main body unit 43. An inlet (e.g., discharge inlet H21) and an outlet (e.g., discharge outlet H22) face the discharge-side fuel chamber F2 (see FIG. 5B).

The discharge path L13 includes a portion upstream of the discharge-side fuel chamber F2 (e.g., upstream-side discharge path L13*a*) and a portion downstream of the discharge-side fuel chamber F2 (e.g., downstream-side discharge path L13*b*). The discharge inlet H21 fluidly couples the upstream-side discharge path L13*a* and the discharge-side fuel chamber F2. The discharge outlet H22 fluidly couples the discharge-side fuel chamber F2 and the downstream-side discharge path L13*b*. The discharge inlet H21 serves as an inlet through which fuel flows from the upstream-side discharge path L13*a* into the discharge-side fuel chamber F2. The discharge outlet H22 serves as an outlet through which fuel flows out from the discharge-side fuel chamber F2 to the downstream-side discharge path L13*b*.

In the high-pressure-side diaphragm 20, a portion forming a part of the pump chamber R21 is a high-pressure-side actuating portion 20*a*. Further, the portion of the high-pressure-side diaphragm 20 that is not part of the pump chamber R21 but is located in the fuel chamber FR is a valve actuating portion 23. The valve actuating portion 23 includes a supply-side valve actuating portion 23*a* located in the supply-side fuel chamber F1 and a discharge-side valve actuating portion 23*b* located in the discharge-side fuel chamber F2.

The high-pressure-side diaphragm 20 includes a supply-side fixing portion 22*a* connected to the high-pressure-side actuating portion 20*a* and the supply-side valve actuating portion 23*a*, and a discharge-side fixing portion 22*b* connected to the high-pressure-side actuating portion 20*a* and the discharge-side valve actuating portion 23*b*. The supply-side fixing portion 22*a* is located between the high-pressure-side actuating portion 20*a* and the supply-side valve actuating portion 23*a*, and is sandwiched and held between a first diaphragm holding portion (e.g., second main body unit 42) and a second diaphragm holding portion (e.g., third main body unit 43). The discharge-side fixing portion 22*b* is located between the high-pressure-side actuating portion 20*a* and the discharge-side valve actuating portion 23*b*, and is sandwiched and held between the first diaphragm holding portion (e.g., second main body unit 42) and the second diaphragm holding portion (e.g., third main body unit 43).

The supply valve 50 is provided in the supply path L12. The supply valve 50 allows only the flow of the fuel in the direction toward the pump chamber R21. The discharge valve 60 is provided in the discharge path L13. The discharge valve 60 allows only the flow of the fuel in the direction in which the fuel is discharged from the pump chamber R21. When the high-pressure-side actuating portion 20*a* operates, the supply valve 50 and the discharge valve 60 are opened and closed such that fuel is sent from the supply path L12 to the pump chamber R21 and is discharged from the pump chamber R21 via the discharge path L13. The supply valve 50 and the discharge valve 60 are opened and closed such that the pump mechanism is implemented by the actuation of the high-pressure-side actuating portion 20*a*.

Figure 3A:
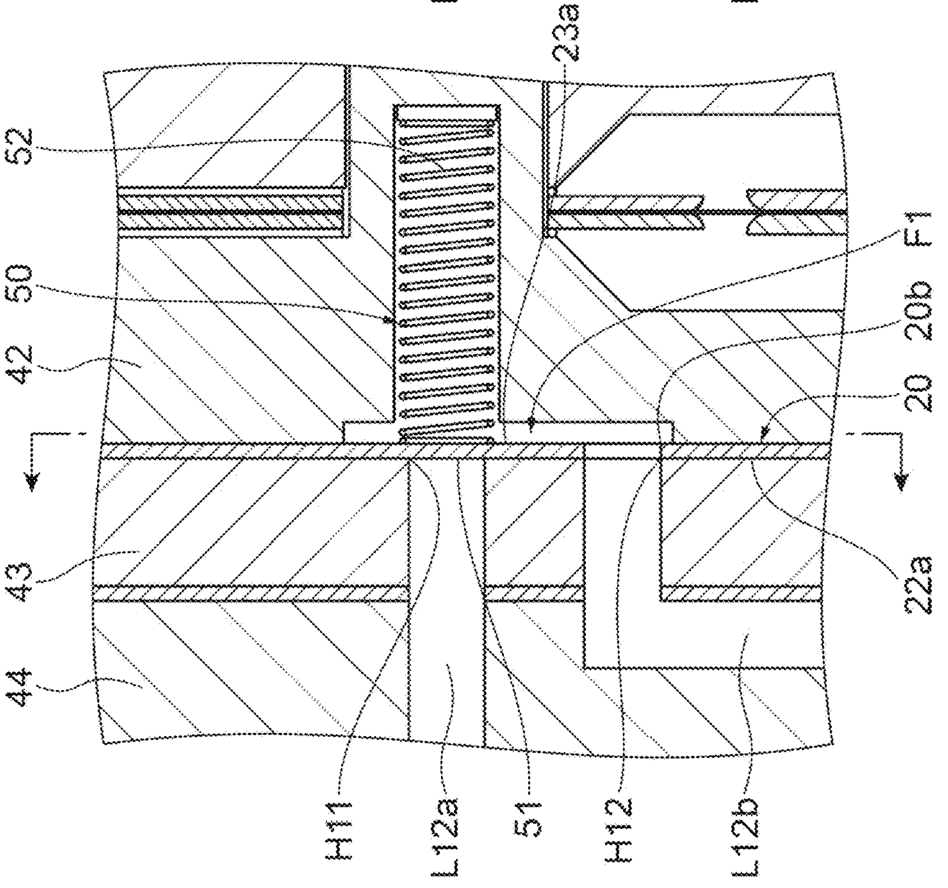
FIG. 3A is an enlarged cross-sectional view of a supply valve in a state where the valve is closed.
Figure 3B:
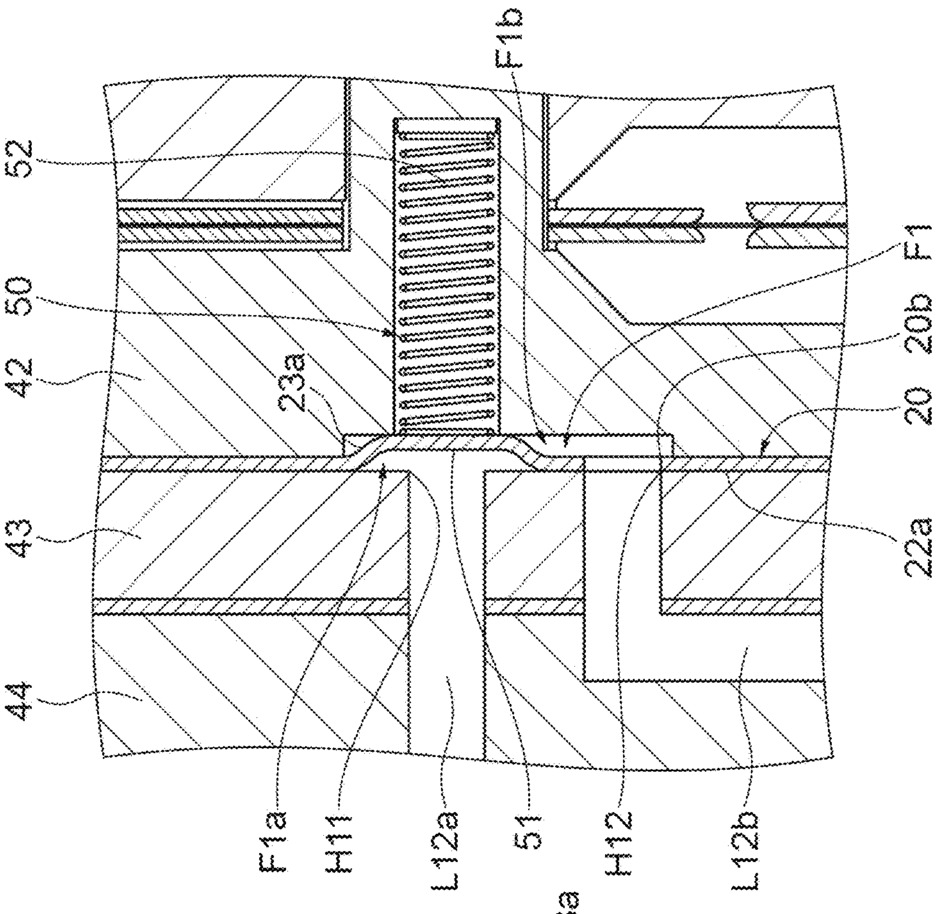
FIG. 3B is an enlarged cross-sectional view of the supply valve in a state where the valve is opened.

As illustrated in FIGS. 3A and 3B, the supply-side valve actuating portion 23*a* includes a supply-side valve body 51. The supply valve 50 includes the supply-side valve body (valve body) 51 and a supply-side biasing member (e.g., supply-side spring 52). The supply-side spring 52 is, for example, a coil spring or a leaf spring. The supply-side valve body 51 is located in the supply-side fuel chamber F1. The supply-side valve body 51 openably covers the supply inlet H11 facing the supply-side fuel chamber F1. The supply-side spring 52 biases the supply-side valve body 51 so that the supply inlet H11 is closed. The supply valve 50 allows only the flow of the fuel in the direction from the suction port S2 to the pump chamber R21 in the supply path L12 by the opening and closing operation of the supply-side valve body 51, and blocks the flow of the fuel in the opposite direction.

The supply-side valve actuating portion 23*a* is located between the supply inlet H11 and the supply-side spring 52 so as to partition the supply first region F1*a* in which the supply inlet H11 is located and the supply second region F1*b* in which the supply-side spring 52 is located.

Figure 4:
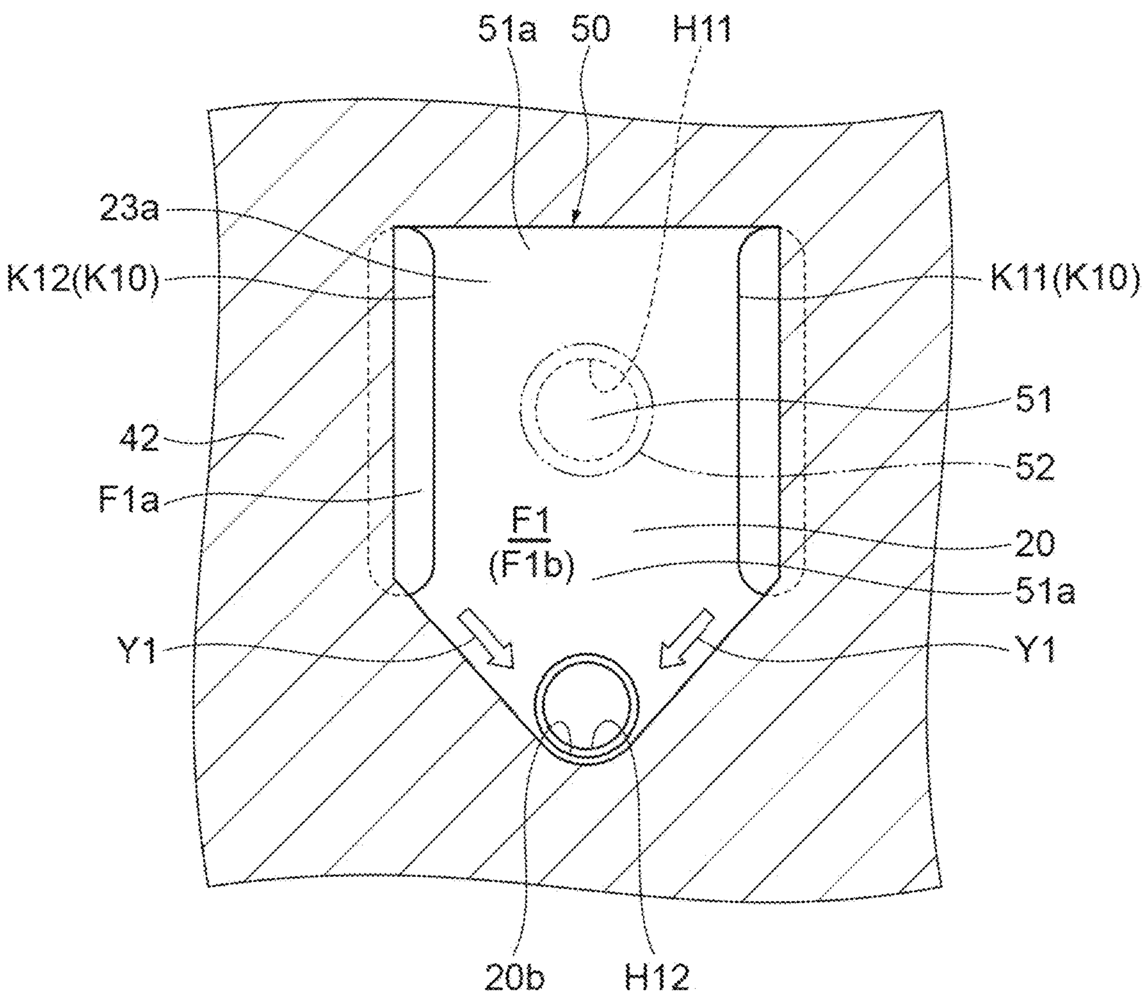
FIG. 4 is a cross-sectional view taken along line IV-IV of FIG. 3A.

As illustrated in FIG. 4, the supply-side valve actuating portion 23*a* includes a supply first passage port K10 that fluidly couples the supply first region F1*a* and the supply second region F1*b* while avoiding the supply-side valve body 51, and a supply second passage port (e.g., outflow hole 20*b*) that faces the supply outlet H12 and fluidly couples the supply outlet H12 and the supply second region F1*b*. In some examples, the supply-side valve actuating portion 23*a* has a width that narrows as it gets further away from the supply inlet H11 around the outflow hole 20*b*.

When the high-pressure-side actuating portion 20*a* performs the suction operation by the pulsation pressure, the supply-side valve body 51 moves so as to contract the supply-side spring 52 as illustrated in FIG. 3B. This suction operation is an operation of the high-pressure-side actuating portion 20*a* that increases the volume in the pump chamber R21. The suction operation of the high-pressure-side actuating portion 20*a* causes the downstream-side supply path L12*b* and the pump chamber R21 to have a negative pressure. As a result, the supply-side valve body 51 is bent against the biasing force of the supply-side spring 52 and moves so as to be separated from the supply inlet H11. The movement of the supply-side valve body 51 opens the supply inlet H11, and the fuel is suctioned from the suction port S2 toward the pump chamber R21.

Here, the fuel flowing through the upstream-side supply path L12*a* by the suction operation of the high-pressure-side actuating portion 20*a* passes through the opened supply inlet H11 and flows into the supply first region F1*a*. The fuel flowing into the supply first region F1*a* passes through the supply first passage port K10, flows into the supply second region F1*b*, further passes through the outflow hole 20*b*, and reaches the supply outlet H12. The fuel that has reached the supply outlet H12 flows through the downstream-side supply path L12*b* and is supplied to the pump chamber R21.

When the high-pressure-side actuating portion 20*a* performs the discharge operation by the pulsation pressure, the supply-side valve body 51 is pressed toward the supply inlet H11 as illustrated in FIG. 3A. This discharge operation is an operation of the high-pressure-side actuating portion 20*a* that reduces the volume in the pump chamber R21. The fuel pressurized in the pump chamber R21 biases the supply-side valve body 51 toward the supply inlet H11 via the downstream-side supply path L12*b*, and the supply-side spring 52 biases the supply-side valve body 51 toward the supply inlet H11. Therefore, when the discharge operation is performed, the supply-side valve body 51 closes the supply inlet H11, and the fuel does not flow into the supply-side fuel chamber F1 from the upstream-side supply path L12*a*.

As illustrated in FIG. 4, the supply first passage port K10 includes a pair of slits provided so as to sandwich the supply inlet H11. One slit is a first suction-side slit K11, and the other slit is a second suction-side slit K12. The supply inlet H11 is located between the first suction-side slit K11 and the second suction-side slit K12. In some examples, the supply-side valve body 51 is configured by a portion of the high-pressure-side diaphragm 20 between the first suction-side slit K11 and the second suction-side slit K12. Further, the supply-side valve body 51 is configured by a part of the supply-side valve actuating portion 23*a*, which is a portion of the high-pressure-side diaphragm 20 other than the high-pressure-side actuating portion 20*a*. The supply-side valve body 51 includes end portions 51*a* at both ends in the extending direction of the first suction-side slit K11 and the second suction-side slit K12. Both end portions 51*a* and 51*a* of the supply-side valve body 51 are connected to other portions of the supply-side valve actuating portion 23*a*.

The outflow hole 20*b* is provided in a portion of the high-pressure-side diaphragm 20 facing the supply outlet H12. The outflow hole 20*b* is located so as to partially or entirely overlap the supply outlet H12.

The first suction-side slit K11 and the second suction-side slit K12 are linearly extending openings, and are located substantially parallel to each other. The extending direction of the first suction-side slit K11 and the extending direction of the second suction-side slit K12 are along the flow direction of the fuel from the supply inlet H11 to the supply outlet H12 in the supply-side fuel chamber F1.

As illustrated in FIGS. 3B and 4, the supply-side valve body 51 moves by the high-pressure-side actuating portion 20*a* performing the suction operation, and the supply inlet H11 is opened. As a result, the fuel flowing into the supply first region F1*a* via the supply inlet H11 flows into the supply second region F1*b* via the first suction-side slit K11 and the second suction-side slit K12. The fuel flowing into the supply second region F1*b* flows out to the downstream-side discharge path L13*b* via the outflow hole 20*b* of the supply-side valve actuating portion 23*a* and the supply outlet H12.

The supply-side fuel chamber F1 is narrower toward the supply outlet H12 around the supply outlet H12. For example, the supply-side fuel chamber F1 narrows in width towards the supply outlet H12 as it gets farther from the supply inlet H11 around the supply outlet H12. Also, the supply-side spring 52 is an annular coil spring. The outer diameter of the supply-side spring 52 is larger than the diameter of the supply inlet H11.

Figure 5B:
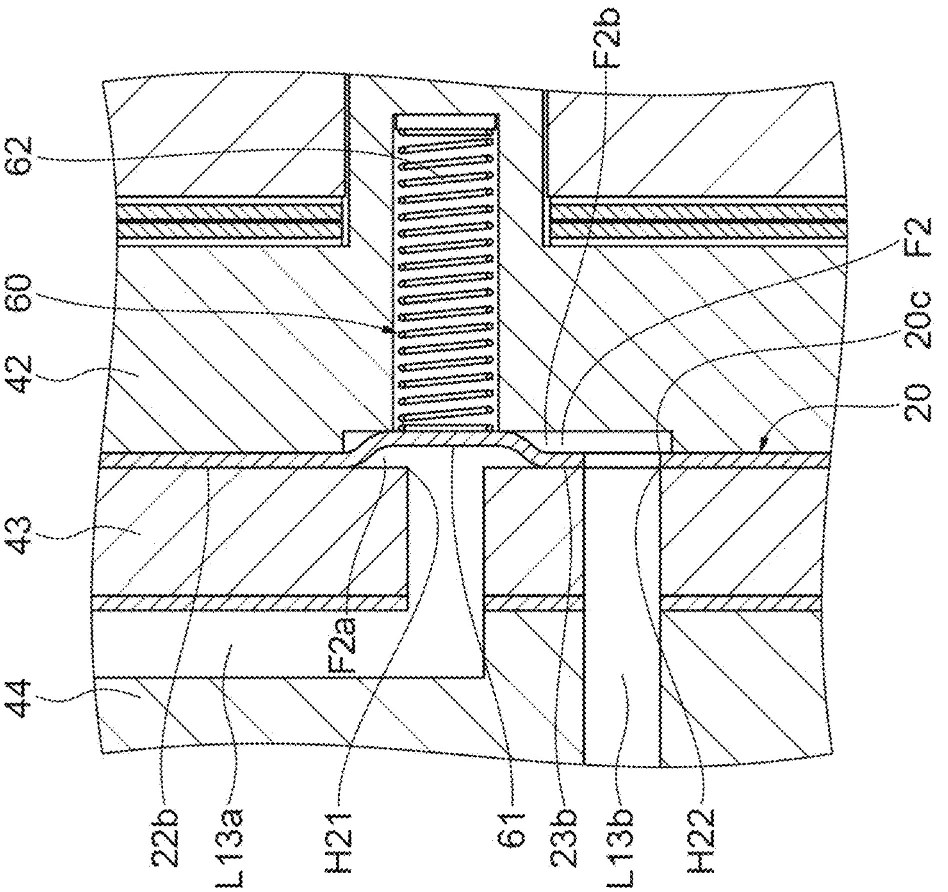
FIG. 5B is an enlarged cross-sectional view of the discharge valve in a state where the valve is opened.
Figure 5A:
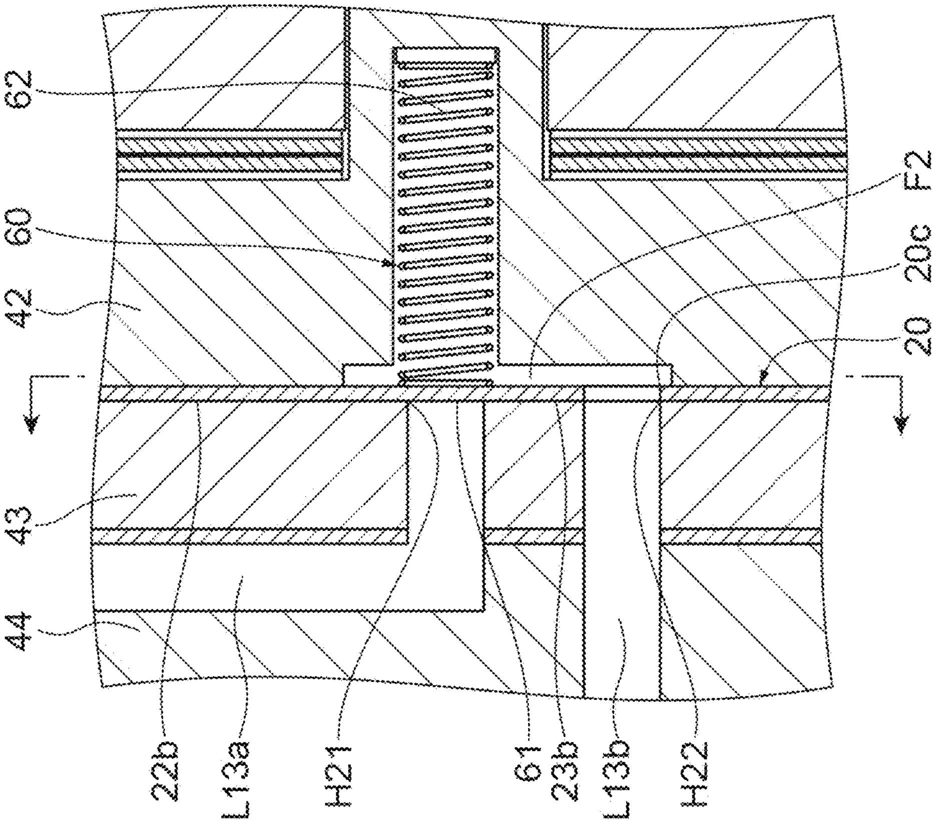
FIG. 5A is an enlarged cross-sectional view of a discharge valve in a state where the valve is closed.

As illustrated in FIGS. 5A and 5B, the discharge-side valve actuating portion 23*b* includes a discharge-side valve body 61. The discharge valve 60 includes the discharge-side valve body (valve body) 61 and a discharge-side biasing member (e.g., discharge-side spring 62). The discharge-side spring 62 is, for example, a coil spring or a leaf spring. The discharge-side valve body 61 is located in the discharge-side fuel chamber F2. The discharge-side valve body 61 openably covers the discharge inlet H21 facing the discharge-side fuel chamber F2. The discharge-side spring 62 biases the discharge-side valve body 61 so that the discharge inlet H21 is closed. The discharge valve 60 allows only the flow of the fuel in the direction from the pump chamber R21 to the discharge port S3 in the discharge path L13 by the opening and closing operation of the discharge-side valve body 61, and blocks the flow of the fuel in the opposite direction.

The discharge-side valve actuating portion 23*b* is located between the discharge inlet H21 and the discharge-side spring 62 so as to partition the discharge first region F2*a* in which the discharge inlet H21 is located and the discharge second region F2*b* in which the discharge-side spring 62 is located.

Figure 6:
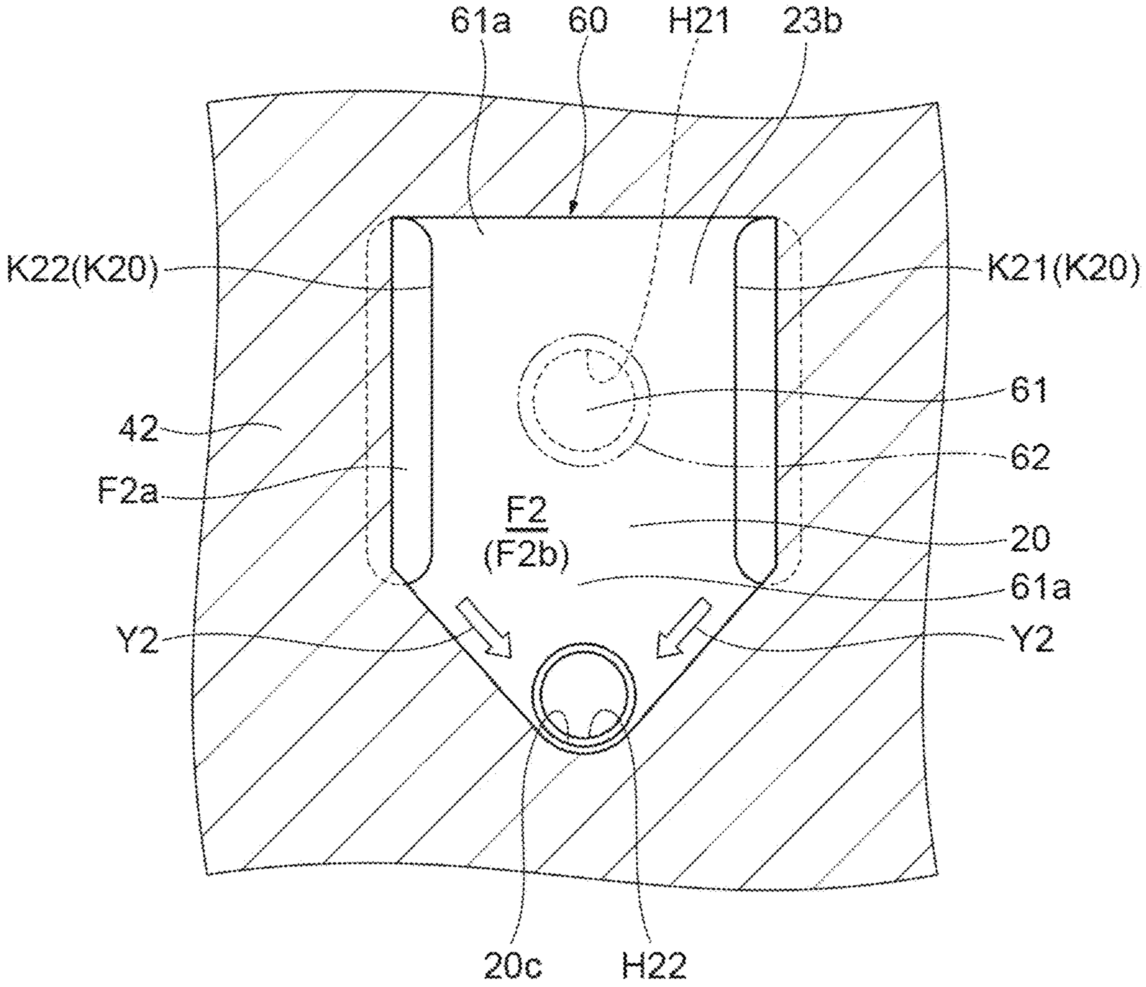
FIG. 6 is a cross-sectional view taken along line VI-VI of FIG. 5A.

As illustrated in FIG. 6, the discharge-side valve actuating portion 23*b* includes a discharge first passage port K20 that fluidly couples the discharge first region F2*a* and the discharge second region F2*b* while avoiding the discharge-side valve body 61, and a discharge second passage port (e.g., outflow hole 20*c*) that faces the discharge outlet H22 and fluidly couples the discharge outlet H22 and the discharge second region F2*b*. In some examples, the discharge-side valve actuating portion 23*b* has a width that narrows as it gets further away from the discharge inlet H21 around the outlet hole 20*c*.

When the high-pressure-side actuating portion 20*a* performs the discharge operation by the pulsation pressure, the discharge-side valve body 61 moves so as to contract the discharge-side spring 62 as illustrated in FIG. 5B. The fuel pressurized in the pump chamber R21 presses the discharge-side valve body 61 via the upstream-side discharge path L13*a*. The force by which the fuel presses the discharge-side valve body 61 opposes the biasing force of the discharge-side spring 62, and when the pressing force of the fuel becomes larger than the biasing force of the discharge-side spring 62, the discharge-side valve body 61 is deflected, and the discharge-side valve body 61 moves so as to be separated from the discharge inlet H21. The movement of the discharge-side valve body 61 opens the discharge inlet H21, and the fuel is discharged from the pump chamber R21 toward the discharge port S3. The biasing force of the discharge-side spring 62 is set so that the discharge-side valve body 61 is not separated from the discharge inlet H21 until the fuel in the pump chamber R21 reaches a predetermined pressure. The diaphragm pump 1 can discharge fuel of a predetermined pressure.

Here, the fuel flowing through the upstream-side discharge path L13*a* by the discharge operation of the high-pressure-side actuating portion 20*a* passes through the opened discharge inlet H21 and flows into the discharge first region F2*a*. The fuel flowing into the discharge first region F2*a* passes through the discharge first passage port K20, flows into the discharge second region F2*b*, further passes through the outflow hole 20*c*, and reaches the discharge outlet H22. The fuel that has reached the discharge outlet H22 flows through the downstream-side discharge path L13*b* and is discharged from the diaphragm pump 1.

When the high-pressure-side actuating portion 20*a* performs the suction operation by the pulsation pressure, the discharge-side valve body 61 is pressed toward the discharge inlet H21 as illustrated in FIG. 5A. The suction operation of the high-pressure-side actuating portion 20*a* causes the upstream-side discharge path L13*a* and the pump chamber R21 to have a negative pressure. As a result, the discharge-side valve body 61 is biased toward the discharge inlet H21 by the negative pressure and is biased toward the discharge inlet H21 by the discharge-side spring 62. Therefore, when the suction operation is performed, the discharge-side valve body 61 closes the discharge inlet H21, and the fuel does not flow into the discharge-side fuel chamber F2 from the upstream-side discharge path L13*a*.

As illustrated in FIG. 6, the discharge first passage port K20 includes a pair of slits provided so as to sandwich the discharge inlet H21. One slit is a first discharge-side slit K21, and the other slit is a second discharge-side slit K22. The discharge inlet H21 is located between the first discharge-side slit K21 and the second discharge-side slit K22. In some examples, the discharge-side valve body 61 is configured by a portion of the high-pressure-side diaphragm 20 between the first discharge-side slit K21 and the second discharge-side slit K22. Further, the discharge-side valve body 61 is configured by a part of the discharge-side valve actuating portion 23*b*, which is a portion of the high-pressure-side diaphragm 20 other than the high-pressure-side actuating portion 20*a*. The discharge-side valve body 61 includes end portions 61*a* at both ends in the extending direction of the first discharge-side slit K21 and the second discharge-side slit K22. Both end portions 61*a* and 61*a* of the discharge-side valve body 61 are coupled with other portions of the discharge-side valve actuating portion 23*b*. As described above, the high-pressure-side diaphragm 20 includes the high-pressure-side actuating portion 20*a* and the valve actuating portion 23.

The outflow hole 20*c* is provided in a portion of the high-pressure-side diaphragm 20 facing the discharge outlet H22. The outflow hole 20*c* is located so as to partially or entirely overlap the discharge outlet H22.

The first discharge-side slit K21 and the second discharge-side slit K22 are linearly extending openings, and are located substantially parallel to each other. The extending direction of the first discharge-side slit K21 and the extending direction of the second discharge-side slit K22 are along the flow direction of the fuel from the discharge inlet H21 to the discharge outlet H22 in the discharge-side fuel chamber F2.

As illustrated in FIGS. 5B and 6, the discharge-side valve body 61 moves by the high-pressure-side actuating portion 20*a* performing the discharge operation, and the discharge inlet H21 is opened. As a result, the fuel flowing into the discharge first region F2*a* via the discharge inlet H21 flows into the discharge second region F2*b* via the first discharge-side slit K21 and the second discharge-side slit K22. The fuel flowing into the discharge second region F2*b* flows out to the downstream-side discharge path L13*b* via the outflow hole 20*c* of the discharge-side valve actuating portion 23*b* and the discharge outlet H22.

The discharge-side fuel chamber F2 is narrower toward the discharge outlet H22 around the discharge outlet H22. For example, the discharge-side fuel chamber F2 narrows in width towards the discharge outlet H22 as it gets farther from the discharge inlet H21 around the discharge outlet H22. Also, the discharge-side spring 62 is an annular coil spring. The outer diameter of the discharge-side spring 62 is larger than the diameter of the discharge inlet H21.

As described above, in the diaphragm pump 1, the supply-side valve body 51 of the supply valve 50 is configured by a part of the high-pressure-side diaphragm 20. Further, in the diaphragm pump 1, the discharge-side valve body 61 of the discharge valve 60 is configured by a part of the high-pressure-side diaphragm 20. The high-pressure-side diaphragm 20 includes the high-pressure-side actuating portion 20*a*, the supply-side valve body 51, and the discharge-side valve body 61. Therefore, the diaphragm pump 1 does not require a separate valve body component, allowing for a reduction in the number of parts.

The supply-side valve body 51 of the supply valve 50 is biased by the supply-side spring 52. The discharge-side valve body 61 of the discharge valve 60 is biased by the discharge-side spring 62. Accordingly, even when the pulsation pressure of the crank chamber 2*a* changes at a high speed, the supply-side valve body 51 and the discharge-side valve body 61 can perform the opening and closing operation following the change in the pulsation pressure.

The supply first passage port K10 may include the first suction-side slit K11 and the second suction-side slit K12 provided so as to sandwich the supply inlet H11. Further, the supply-side valve body 51 of the supply valve 50 is located between the first suction-side slit K11 and the second suction-side slit K12. In this case, the supply-side valve body 51 is in a state where both end portions in the extending direction of the first suction-side slit K11 and the second suction-side slit K12 are coupled with the other portion of the supply-side valve actuating portion 23*a*. Therefore, in the supply-side valve body 51, since the opening and closing operation of the supply inlet H11 is performed in a state where both end portions are supported, the occurrence of turn-up in the movement is suppressed. As a result, the supply-side valve body 51 may perform the opening and closing operation of the supply inlet H11. When the supply-side valve body 51 opens the supply inlet H11, the fuel flows so as to branch to both sides across the supply-side valve body 51, and flows so as to pass through both the first suction-side slit K11 and the second suction-side slit K12. Therefore, a biased flow is less likely to occur, and turning or the like of the supply-side valve body 51 is less likely to occur.

The discharge first passage port K20 may include the first discharge-side slit K21 and the second discharge-side slit K22 provided so as to sandwich the discharge inlet H21. Further, the discharge-side valve body 61 of the discharge valve 60 is located between the first discharge-side slit K21 and the second discharge-side slit. In this case, the discharge-side valve body 61 is in a state where both end portions in the extending direction of the first discharge-side slit K21 and the second discharge-side slit K22 are coupled with the other portion of the discharge-side valve actuating portion 23*b*. Therefore, in the discharge-side valve body 61, since the opening and closing operation of the discharge inlet H21 is performed in a state where both end portions are supported, the occurrence of turn-up in the movement is suppressed. As a result, the discharge-side valve body 61 may perform the opening and closing operation of the discharge inlet H21. When the discharge-side valve body 61 opens the discharge inlet H21, the fuel flows so as to branch to both sides across the discharge-side valve body 61, and flows so as to pass through both the first discharge-side slit K21 and the second discharge-side slit K22. Therefore, a biased flow is less likely to occur, and turning or the like of the supply-side valve body 51 is less likely to occur.

The extending directions of the first suction-side slit K11 and the second suction-side slit K12 are along the flow direction of the fuel from the supply inlet H11 to the supply outlet H12 in the supply-side fuel chamber F1. In this case, it is difficult to disturb the flow of the fuel, and the occurrence of turn-up and the like of the supply-side valve body 51 due to the flow of the fuel is prevented in the supply-side fuel chamber F1. In some examples, both end portions of the supply-side valve body 51 along the fuel flow direction are coupled with the other portion of the supply-side valve actuating portion 23*a*. The supply-side valve body 51 does not extend across the flow of the fuel. The supply-side valve body 51 extends along the fuel flow direction. Therefore, in the supply-side valve body 51, the occurrence of turn-up and the like due to the flow of the fuel in the supply-side fuel chamber F1 is prevented.

Also, the extending directions of the first discharge-side slit K21 and the second discharge-side slit K22 are along the flow direction of the fuel from the discharge inlet H21 to the discharge outlet H22 in the discharge-side fuel chamber F2. In this case, it is difficult to disturb the flow of the fuel, and the occurrence of turn-up and the like of the discharge-side valve body 61 due to the flow of the fuel is prevented in the discharge-side fuel chamber F2. In some examples, both end portions of the discharge-side valve body 61 along the fuel flow direction are coupled with the other portion of the discharge-side valve actuating portion 23*b*. The discharge-side valve body 61 does not extend across the flow of the fuel. The discharge-side valve body 61 extends along the fuel flow direction. Therefore, in the discharge-side valve body 61, the occurrence of turn-up and the like due to the flow of the fuel in the discharge-side fuel chamber F2 is prevented.

The supply-side fuel chamber F1 is narrower toward the supply outlet H12 around the supply outlet H12. In this case, the diaphragm pump 1 can guide the fuel flowing from the supply inlet H11 toward the supply outlet H12 toward the supply outlet H12 as indicated by an arrow Y1 in FIG. 4, in the supply-side fuel chamber F1. Further, the discharge-side fuel chamber F2 is narrower toward the discharge outlet H22 around the discharge outlet H22. In this case, the diaphragm pump 1 can guide the fuel flowing from the discharge inlet H21 toward the discharge outlet H22 toward the discharge outlet H22 as indicated by an arrow Y2 in FIG. 6 in the discharge-side fuel chamber F2. As described above, the diaphragm pump 1 can suppress stagnation of the fuel in the supply-side fuel chamber F1 and the discharge-side fuel chamber F2.

In the supply valve 50, the outer diameter of the supply-side spring 52 is larger than the diameter of the supply inlet H11. In this case, the supply-side spring 52 may bias the supply-side valve body 51 to cover the supply inlet H11 without the supply-side valve body 51 entering the supply inlet H11. Further, in the discharge valve 60, the outer diameter of the discharge-side spring 62 is larger than the diameter of the discharge inlet H21. In this case, the discharge-side spring 62 may bias the discharge-side valve body 61 to cover the discharge inlet H21 without the discharge-side valve body 61 entering the discharge inlet H21.

In some examples, the shape of the pulsation transmission path L11, the shape of the supply path L12, and the shape of the discharge path L13 provided in the main body 40 are not limited to the configuration illustrated in FIG. 2. The configurations of the low-pressure-side actuating portion 10*a* and the high-pressure-side actuating portion 20*a* are also not limited to the above-described configurations.

In some examples, both the supply valve 50 and the discharge valve 60 are provided, but only one of the supply valve 50 and the discharge valve 60 may be provided.

In some examples, both the supply-side valve body 51 and the discharge-side valve body 61 are configured by a part of the high-pressure-side diaphragm 20. Any one of the supply-side valve body 51 and the discharge-side valve body 61 may be configured by a part of the high-pressure-side diaphragm 20. In some examples, the high-pressure-side diaphragm 20 may not include the discharge-side valve body 61 but may be formed of the supply-side valve body 51 which is a part of the supply valve 50, and the discharge-side valve body 61 of the discharge valve 60 may be formed of a member different from the high-pressure-side diaphragm 20. Further, the high-pressure-side diaphragm 20 may not include the supply-side valve body 51 but may be formed of the discharge-side valve body 61 which is a part of the discharge valve 60, and the supply-side valve body 51 of the supply valve 50 may be formed of a member different from the high-pressure-side diaphragm 20.

Further, both the supply-side valve body 51 and the discharge-side valve body 61 are not limited to being configured by a part of the high-pressure-side diaphragm 20. At least one of the supply-side valve body 51 and the discharge-side valve body 61 may be configured by a part of the low-pressure-side diaphragm (diaphragm) 10.

The diaphragm pump 1 is not limited to including the two diaphragms of the low-pressure-side diaphragm 10 and the high-pressure-side diaphragm 20. The diaphragm pump 1 may be configured to include only one diaphragm. In this case, at least one of the supply-side valve body 51 and the discharge-side valve body 61 may be configured by a part of the diaphragm provided in the diaphragm pump 1.

Some additional examples are disclosed as follows, with continued reference to the drawings for convenience of description.

An example diaphragm pump (1) may be actuated by receiving a pulsation pressure in a crank chamber (2*a*) of an engine (2). The diaphragm pump (1) may include a discharge chamber (R21), a diaphragm (20) having a diaphragm actuating portion (20*a*) actuated by the pulsation pressure and configured to suction fuel into the discharge chamber (R21) and to discharge the fuel from the discharge chamber (R21), a supply path (L12) configured to supply the fuel to the discharge chamber (R21), a supply valve (50) provided in the supply path (L12) and configured to restrict a directional flow of the fuel in the supply path (L12), and a supply-side fuel chamber (F1) provided in a middle portion of the supply path (L12). The supply path (L12) may include a supply inlet (H11) through which the fuel flows into the supply-side fuel chamber (F1). The supply valve (50) may include a supply-side valve body (51) located in the supply-side fuel chamber (F1) and configured to selectively open and close the supply inlet (H11), and a supply-side biasing member (52) configured to bias the supply-side valve body (51) such that the supply inlet (H11) is closed. The supply-side valve body (51) may be a portion of the diaphragm (20) other than the diaphragm actuating portion (20*a*).

The supply path (L12) may include an upstream-side supply path (L12*a*) located upstream of the supply-side fuel chamber (F1) and fluidly coupled to the supply inlet (H11), a downstream-side supply path (L12*b*) located downstream of the supply-side fuel chamber (F1), and a supply outlet (H12) through which the fuel flows out from the supply-side fuel chamber (F1) to the downstream-side supply path (L12*b*).

The diaphragm (20) may include a supply-side valve actuating portion (23*a*) located between the supply inlet (H11) and the supply-side biasing member (52) so as to partition a supply first region (F1*a*) in which the supply inlet (H11) is located and a supply second region (F1*b*) in which the supply-side biasing member (52) is located and including the supply-side valve body (51).

The supply-side valve actuating portion (23*a*) may include a supply first passage port (K10) spaced apart from the supply-side valve body (51) and that fluidly couples the supply first region (F1*a*) and the supply second region (F1*b*), and a supply second passage port (20*b*) that faces the supply outlet (H12) and fluidly couples the supply outlet (H12) and the supply second region (F1*b*).

The supply first passage port (K10) may include a first suction-side slit (K11) and a second suction-side slit (K12) that sandwich the supply inlet (H11), and the supply-side valve body (51) is located between the first suction-side slit (K11) and the second suction-side slit (K12).

An extending direction of the first suction-side slit (K11) and the second suction-side slit (K12) may be along a flow direction of the fuel from the supply inlet (H11) toward the supply outlet (H12) in the supply-side fuel chamber (F1).

The supply path (L12) may include a downstream-side supply path (L12*b*) located downstream of the supply-side fuel chamber (F1), and a supply outlet (H12) through which the fuel flows out from the supply-side fuel chamber (F1) to the downstream-side supply path (L12*b*). The supply-side fuel chamber (F1) may narrow in width towards the supply outlet (H12) as it gets farther from the supply inlet (H11) around the supply outlet (H12).

The supply-side biasing member (52) may comprise a coil spring. An outer diameter of the supply-side biasing member (52) may be larger than a diameter of the supply inlet (H11).

Another example diaphragm pump (1) may include a discharge chamber (R21) a diaphragm (20) configured to be actuated by a pulsation pressure, a fuel flow path (La) fluidly coupled with the discharge chamber (R21), and a fuel chamber (FR) located on the fuel flow path (La). The diaphragm (20) may include a diaphragm actuating portion (20*a*) forming a part of the discharge chamber (R21), and configured to suction fuel into the discharge chamber (R21) and to discharge the fuel from the discharge chamber (R21) in response to being actuated by the pulsation pressure, and a valve actuating portion (23) located in the fuel chamber (FR) and configured to selectively open and close the fuel flow path (La).

The valve actuating portion (23) may block the fuel from flowing through the fuel flow path (La) in a reverse direction when the flow path (La) is closed.

The fuel flow path (La) may include a supply path (L12) through which the fuel supplied to the discharge chamber (R21) flows. The fuel chamber (FR) may include a supply-side valve chamber (F1) located in a middle portion of the supply path (L12). The valve actuating portion (23) may include a supply-side valve actuating portion (23*a*) located in the supply-side valve chamber (F1) and configured to selectively open and close the supply path (L12). The supply-side valve actuating portion (23*a*) may be configured to allow the fuel to flow from the supply-side valve chamber (F1) to the discharge chamber (R21) when the supply path (L12) is open, and to block the fuel from flowing in the reverse direction when the supply path (L12) is closed.

The fuel flow path (La) may include wherein the fuel flow path (La) may include a discharge path (L13) through which the fuel discharged from the discharge chamber (R21) flows. The fuel chamber (FR) may include a discharge-side valve chamber (F2) located in a middle portion of the discharge path (L13). The valve actuating portion (23) includes a discharge-side valve actuating portion (23*b*) located in the discharge-side valve chamber (F2) and configured to selectively open and close the discharge path (L13). The discharge-side valve actuating portion (23*b*) may be configured to allow the fuel to be discharged from the discharge chamber (R21) when the discharge path (L13) is open and to block the flow in the reverse direction when the discharge path (L13) is closed.

The diaphragm pump (1) may include a main body (40) including the discharge chamber (R21) and the supply-side valve chamber (F1). The main body (40) may include a first diaphragm holding portion (42) and a second diaphragm holding portion (43) that both hold the diaphragm (20). The diaphragm (20) may include a discharge-side fixing portion (22*b*) connected to the diaphragm actuating portion (20*a*) and the discharge-side valve actuating portion (23*b*). The discharge-side fixing portion (22*b*) may be sandwiched between the first diaphragm holding portion (42) and the second diaphragm holding portion (43).

The discharge path (L13) may include an upstream-side discharge path (L13*a*) including a discharge inlet (H21) that is fluidly coupled with the discharge-side valve chamber (F2), and a downstream-side discharge path (L13*b*) fluidly coupled with the discharge-side valve chamber (F2). The discharge-side valve actuating portion (23*b*) includes a discharge-side valve body (61) configured to selectively open and close the discharge inlet (H21) in the discharge-side valve chamber (F2).

The diaphragm pump (1) may include a discharge-side biasing member (62) located in the discharge-side valve chamber (F2) and configured to bias the discharge-side valve body (61) to close the discharge inlet (H21).

The discharge-side valve actuating portion (23*b*) may be located between the discharge inlet (H21) and the discharge-side biasing member (62) so as to partition the discharge-side valve chamber (F2) into a discharge first region (F2*a*) in which the discharge inlet (H21) is located and a discharge second region (F2*b*) in which the discharge-side biasing member (62) is located.

The downstream-side discharge path (L13*b*) may include a discharge outlet (H22) fluidly coupled with the discharge-side valve chamber (F2). The discharge-side valve actuating portion (23*b*) may include a discharge first passage port (K20) spaced apart from the discharge-side valve body (61) and that fluidly couples the discharge first region (F2*a*) and the discharge second region (F2*b*), and a discharge second passage port (20*c*) that fluidly couples the discharge outlet (H22) and the discharge second region (F2*b*).

The discharge first passage port (K20) may include first discharge-side slit (K21) and a second discharge-side slit (K22) located in the discharge-side valve chamber (F2). The discharge-side valve body (61) may be located between the first discharge-side slit (K21) and the second discharge-side slit (K22).

The discharge second passage port (20*c*) may face the discharge outlet (H22). The discharge-side valve actuating portion (23*b*) may have a width that narrows as it gets further away from the discharge inlet (H21) around the discharge second passage port (20*c*).

What is claimed is:

1. A diaphragm pump actuated by pulsation pressure received in a crank chamber of an engine, the diaphragm pump comprising:
- a supply-side fuel chamber;
- a discharge chamber;
- a diaphragm having:
  - a supply-side valve actuating portion configured to allow fuel to flow from the supply-side fuel chamber to the discharge chamber while preventing the fuel from flowing from the discharge chamber to the supply-side fuel chamber; and
  - a diaphragm actuating portion actuated by the pulsation pressure and configured to suction the fuel into the discharge chamber and to discharge the fuel from the discharge chamber;
- a supply path configured to supply the fuel from the supply-side fuel chamber to the discharge chamber; and
- a supply valve configured to restrict the flow direction of the fuel in the supply path,
- wherein the supply-side fuel chamber includes a supply inlet through which the fuel flows into the supply-side fuel chamber,
- wherein the supply valve includes:
  - the supply-side valve actuating portion of the diaphragm located adjacent to the supply inlet and configured to selectively open and close the supply inlet; and
  - a supply-side biasing member located in the supply-side fuel chamber and contacting the supply-side valve actuating portion, the supply-side biasing member configured to bias the supply-side valve actuating portion.

2. The diaphragm pump according to claim 1,
- wherein the supply-side fuel chamber comprises a supply outlet through which the fuel flows from the supply-side fuel chamber into the discharge chamber, and
- wherein the supply-side fuel chamber narrows in width towards the supply outlet with increasing distance from the supply inlet, in a region around the supply outlet.

3. The diaphragm pump according to claim 1, wherein the supply-side biasing member comprises a coil spring.

4. The diaphragm pump according to claim 3, wherein an outer diameter of the coil spring is larger than a diameter of the supply inlet.

5. The diaphragm pump according to claim 1, wherein the supply-side valve actuating portion deforms toward the supply-side fuel chamber and away from the supply inlet when the fuel is suctioned into the supply-side fuel chamber.

6. The diaphragm pump according to claim 5, wherein the supply-side fuel chamber comprises a supply outlet through which the fuel flows from the supply-side fuel chamber into the discharge chamber, and wherein, when the supply-side valve actuating portion deforms toward the supply-side fuel chamber, the supply-side valve actuating portion divides the supply-side fuel chamber into a first supply region including the supply inlet and a second supply region including the supply outlet.

7. The diaphragm pump according to claim 6, wherein the supply-side valve actuating portion includes a first supply first passage port that is spaced apart from the supply inlet and, when the supply-side valve actuating portion deforms toward the supply-side fuel chamber, fluidly couples the first supply region and the second supply region.

8. The diaphragm pump according to claim 7, wherein the first supply passage port includes a first suction-side slit and a second suction-side slit, and wherein the supply inlet is located between the first suction-side slit and the second suction-side slit.

9. The diaphragm pump according to claim 8, wherein the first suction-side slit and the second suction-side slit extend along the flow direction of the fuel from the supply inlet toward the supply outlet in the supply-side fuel chamber.

10. The diaphragm pump according to claim 7, wherein the supply-side valve actuating portion includes a second supply passage port that faces the supply outlet and that fluidly couples the supply outlet and the second supply region.

11. The diaphragm pump according to claim 1, wherein, when the diaphragm actuating portion deforms so as to increase a volume in the discharge chamber in response to the pulsation pressure acting on the diaphragm actuating portion, a negative pressure occurring in the discharge chamber and the supply path causes the supply-side valve actuating portion to compress the supply-side biasing member so as to open the supply path.

12. The diaphragm pump according to claim 1, further comprising a main body including a first diaphragm holding portion and a second diaphragm holding portion that both hold the diaphragm, wherein the diaphragm includes a supply-side fixing portion connected to the diaphragm actuating portion and the supply-side valve actuating portion, and wherein the supply-side fixing portion is sandwiched between the first diaphragm holding portion and the second diaphragm holding portion.

13. The diaphragm pump according to claim 12, wherein the discharge chamber and the supply-side fuel chamber are formed between the first diaphragm holding portion and the second diaphragm holding portion.

14. A diaphragm pump comprising:

a discharge chamber;

a fuel chamber;

a low-pressure-side diaphragm configured to be actuated by a pulsation pressure;

a high-pressure-side diaphragm located adjacent to the discharge chamber;

a coupling device connecting the low-pressure-side diaphragm to the high-pressure-side diaphragm, so that, in response to the pulsation pressure, the high-pressure-side diaphragm is configured to be actuated in conjunction with the low-pressure-side diaphragm; and a fuel flow path fluidly coupled between the discharge chamber and the fuel chamber, wherein the high-pressure-side diaphragm includes:

a diaphragm actuating portion configured to suction fuel into the discharge chamber and to discharge the fuel from the discharge chamber in response to being actuated by the pulsation pressure; and a valve actuating portion located adjacent to the fuel chamber and configured to selectively open and close the fuel flow path.

15. The diaphragm pump according to claim 14, wherein the valve actuating portion blocks the fuel from flowing through the fuel flow path in a reverse direction when the flow path is closed.

16. The diaphragm pump according to claim 15, wherein the fuel chamber includes a supply inlet through which the fuel flows into the fuel chamber, wherein the diaphragm pump further comprises a supply-side biasing spring contacting the valve actuating portion, wherein the supply-side biasing spring is configured to bias the valve actuating portion toward the supply inlet such that the valve actuating portion closes the supply inlet, and wherein the valve actuating portion is configured to deform toward the supply-side biasing spring and away from the supply inlet when the fuel is suctioned into the fuel chamber.

17. The diaphragm pump according to claim 15, wherein the fuel chamber includes a discharge inlet through which the fuel flows into the fuel chamber, wherein the diaphragm pump further comprises a discharge-side biasing spring contacting the valve actuating portion, wherein the discharge-side biasing spring is configured to bias the valve actuating portion toward the discharge inlet such that the valve actuating portion closes the discharge inlet, and wherein the valve actuating portion is configured to deform toward the discharge-side biasing spring and away from the discharge inlet when the fuel is discharged from the discharge chamber into the fuel chamber.

18. The diaphragm pump according to claim 17, further comprising a main body including a first diaphragm holding portion and a second diaphragm holding portion that both hold the high-pressure-side diaphragm, wherein the high-pressure-side diaphragm includes a discharge-side fixing portion connected to the diaphragm actuating portion and the valve actuating portion, and wherein the discharge-side fixing portion is sandwiched between the first diaphragm holding portion and the second diaphragm holding portion.

19. The diaphragm pump according to claim 18, wherein the discharge chamber and the fuel chamber are formed between the first diaphragm holding portion and the second diaphragm holding portion.

20. The diaphragm pump according to claim 14, further comprising a wall disposed between the low-pressure-side diaphragm and the high-pressure-side diaphragm, wherein the coupling device includes:

a sleeve passing through the wall and located between the low-pressure-side diaphragm and the high-pressure-side diaphragm, and a rivet inserted through the sleeve and connected to both the low-pressure-side diaphragm and the high-pressure-side diaphragm.

* * * * *